May 1, 1945. G. I. McNEIL 2,375,170
TANK TRACK AND METHOD AND APPARATUS FOR MAKING SAME
Filed Jan. 22, 1942 4 Sheets-Sheet 1
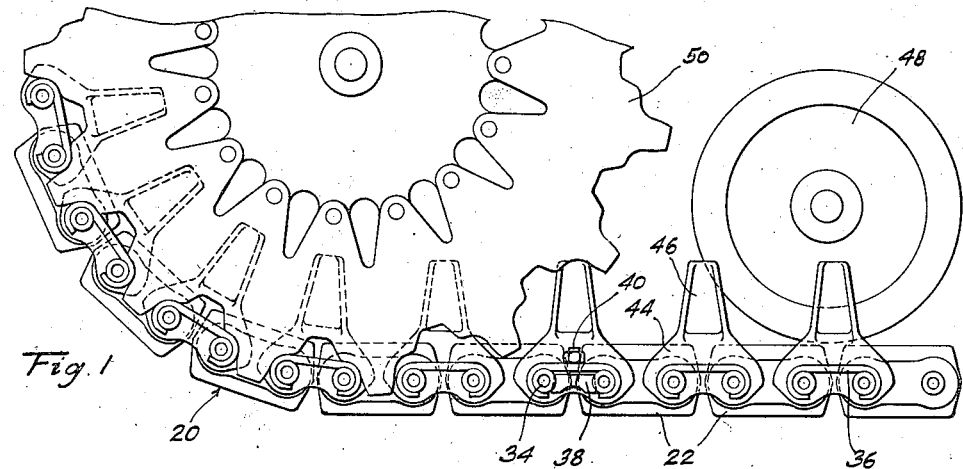
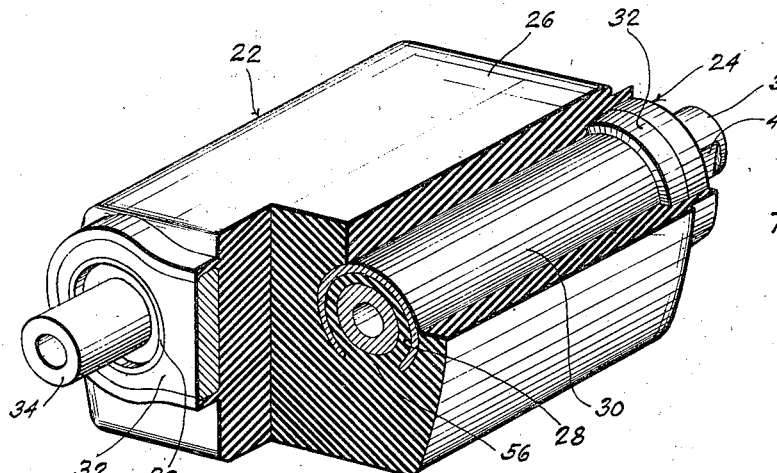
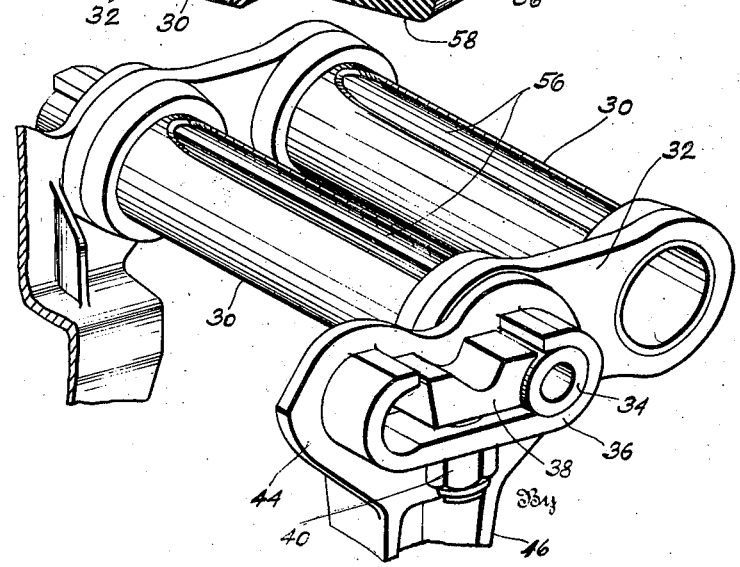
Inventor
Gordon I. McNeil

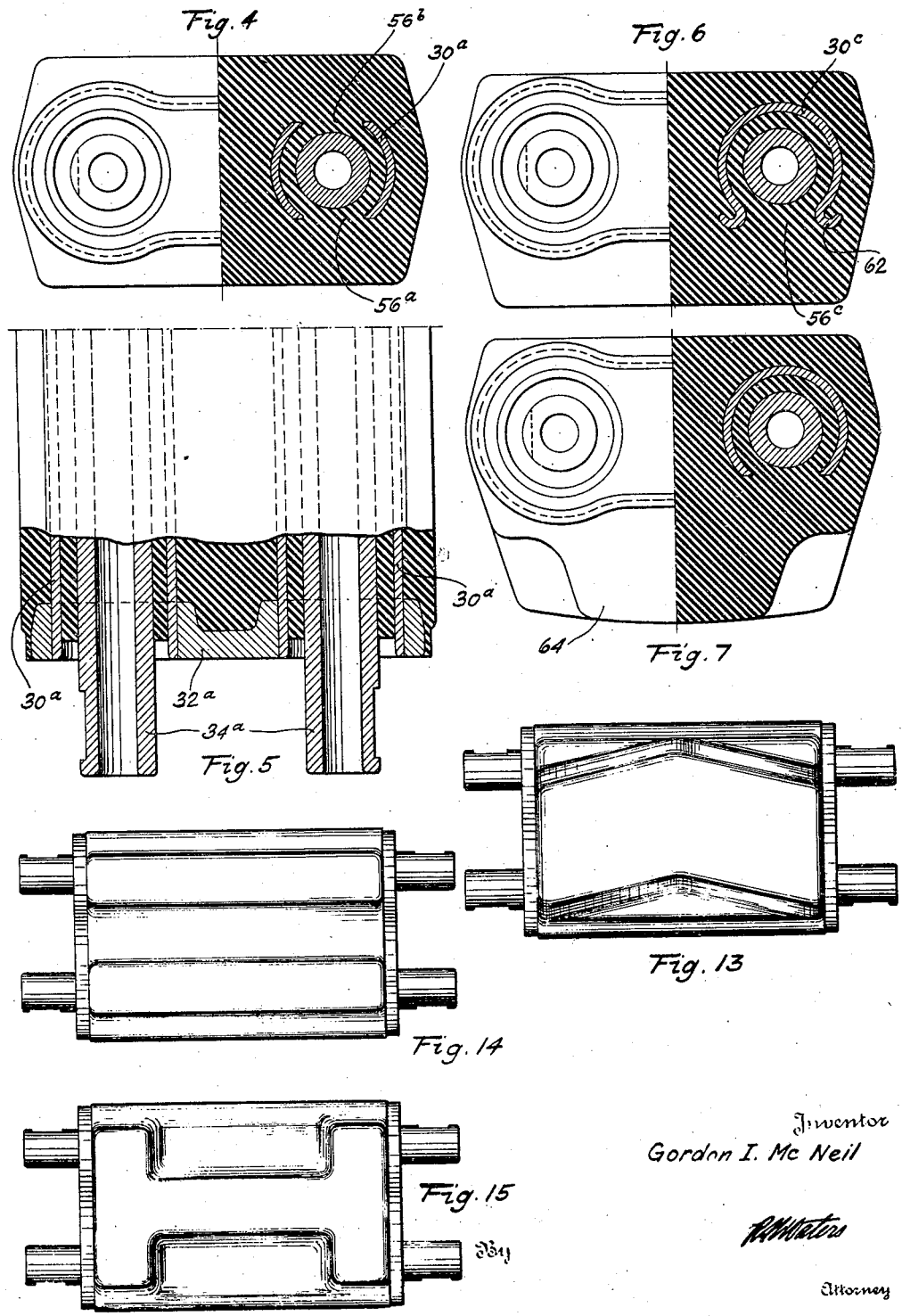

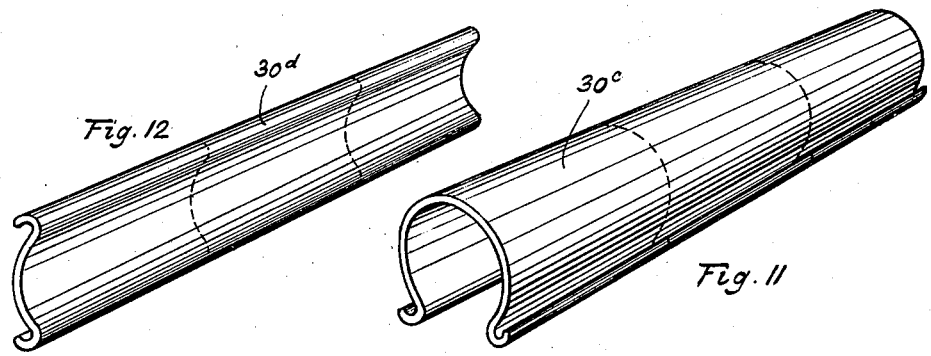
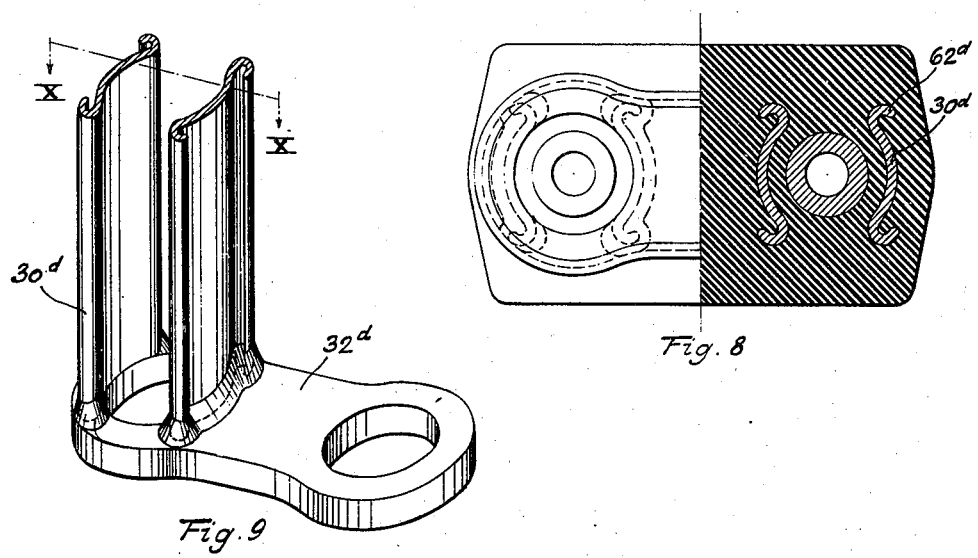
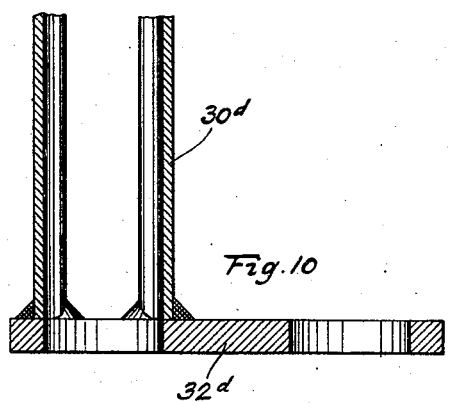
Inventor
Gordon I. McNeil

May 1, 1945. G. I. McNEIL 2,375,170
TANK TRACK AND METHOD AND APPARATUS FOR MAKING SAME
Filed Jan. 22, 1942 4 Sheets-Sheet 4

Inventor
Gordon I. McNeil

Attorney

Patented May 1, 1945

2,375,170

UNITED STATES PATENT OFFICE 2,375,170

TANK TRACK AND METHOD AND APPARATUS FOR MAKING SAME

Gordon I. McNeil, Akron, Ohio, assignor to Wingfoot Corporation, Akron, Ohio, a corporation of Delaware Application January 22, 1942, Serial No. 427,732

16 Claims. (Cl. 305—10)

This invention relates to endless tracks for tanks or other vehicles, and, more specifically, to the individual shoes or blocks which when assembled form the endless track, and with improved methods and apparatus for making the same.

Heretofore, endless tracks have been provided for tanks or other vehicles, the track being formed from a plurality of metal links covered with rubber to provide separate blocks, and with rubber bushings being incorporated in each block. Each of the rubber bushings so incorporated ordinarily comprises an outer metal member of tubular shape, a pin which extends axially of the outer metal member, and a body of rubber vulcanized to and between the pin and the outer metal member. The metal links incorporated in each block or shoe are positioned at the sides of the block and are secured to the ends of the transversely extending outer metal members of the bushings. It has been found that the pounding, bending and wear to which the endless tracks of the character described are subjected in service has caused a concentration of wear on each block in that portion of the block between the tread surface and the transversely positioned outer metal member of each bushing. It seems that the outer metal member of each bushing acts as an anvil upon which the rubber positioned between the outer metal member and the surface of the tread is pounded.

Further, the usual process for making tractor blocks or shoes of the character described has been to first assemble the pin, rubber, and outer metal member of each bushing, then connect each pair of bushings with a pair of side links, and then mold the complete assembly into a large block of rubber. This process involves a plurality of operations and is relatively expensive. In addition, rubber blocks or shoes for endless tracks made as just described include a considerable weight of metal which not only increases the weight of the tank or other vehicle but which functions during the rolling of the endless track to increase the centrifugal force and to accentuate the tendency of the track to be thrown from its supporting and driving means. Likewise, under actual service conditions the rubber bushings, asssembled as above described, yield in a radial direction under stress so that the length of the track is or can be increased to the point where throwing of the track from its supporting and driving means occurs.

It is the general object of my invention to avoid and overcome the foregoing and other difficulties of and objections to known tank tracks and tractor blocks, and methods and apparatus for making the same, by the provision of an improved tractor block having a construction which eliminates the concentration of stress between the tread of the block and the outer metal member of each bushing, gives a greater rubber cushioning action and a greater rubber thickness between the tread and the outer metal member of each bushing without increasing the weight or size of the rubber incorporated in the block, and which improves the bond between each rubber bushing and the associated block.

Another object of my invention is to provide an improved method for making tractor shoes or blocks and wherein the rubber incorporated in the bushing or bushings and the rubber forming the block proper is simultaneously flowed into position and vulcanized between the pin and the outer metal member of each bushing and around the outside of the outer metal bushing member and the associated connecting links.

Another object of my invention is the provision of improved apparatus for facilitating the molding of tractor blocks and the like, and in accordance with which rubber is simultaneously moved into position and vulcanized to form the rubber of the bushing and the rubber of the block.

Another object of my invention is to provide a tractor block or shoe incorporating a pair of rubber bushings therein and with the bushings having greater resistance to radial yield so that the stretching of an endless track formed from the individual blocks is reduced.

Another object of my invention is to provide a tractor block having longitudinally extending metal links positioned at the sides of the block and joining transversely positioned rubber bushings together with the complete weight of the block being reduced without the sacrifice of strength or function and so that the tendency for an endless track made from the individual blocks to jump from its supporting or driving means is reduced.

Another object of my invention is the provision of methods and apparatus for making improved tractor blocks and the like. and wherein and whereby the production of tractor blocks is facilitated, costs are reduced, skilled labor requirements are largely eliminated. time is curtailed to a minimum, the operation and the apparatus is simplified, and in accordance with which an improved product results.

Another object of my invention is to provide an improved block or shoe adapted to form a part of an endless track, said block or shoe including a rubber block having longitudinally extending metal links securing together transversely positioned rubber bushings, all of which are embodied in the block, and with the bushings being of the type including a body of rubber vulcanized to and between an outer metal member and in inner metal pin.

Another object of my invention is the provision of a tractor block of the character described and wherein the bushing pins are accurately positioned angularly with respect to each other, and a further object of my invention is the provision of simple practical methods and apparatus for facilitating and insuring the accurate angular position of the bushing pins during the manufacture of the tractor block.

The foregoing and other objects of my invention are achieved by the provision of a tread shoe for an endless track, the shoe being of the type including a pair of longitudinally extending metal links secured together at their ends by transversely extending bushing members including outer metal means and inner metal means joined together by rubber, the links and bushing members being surrounded by and embedded in a block of rubber, the tread shoe being characterized by outer metal means in the bushing members having wide clearance spaces through which the rubber of the bushing joins the rubber of the block and in the region adjacent the tread surface of the block.

The apparatus of my invention comprises a two part mold which is formed with a recess for receiving and supporting the links and outer bushing members of metal, removable collars received within suitable apertures in the mold and adapted to support metal pins axially within and spaced from the outer bushing members, and means carried by at least one part of the mold and adapted to engage with the metal pins and rotatively align them.

In accordance with the method of my invention, I provide a series of steps for producing a tractor block which steps include flowing the rubber between the bushing pins and the bushing members simultaneously with the flowing of the rubber around the outer bushing members, and vulcanizing the rubber between the bushing pins and outer bushing members and simultaneously around the outer bushing members.

For a better understanding of my invention reference should be had to the accompanying drawings wherein:

Fig. 1 is a fragmentary side elevation of an endless track incorporated with a driving and supporting means, as for example, forming a part of a tank or tractor;

Fig. 2 is a perspective view, partly in section, of one of the tractor blocks or shoes incorporated in the endless track illustrated in Fig. 1;

Fig. 3 is a perspective view of one of the link assemblies forming a part of the endless track of Fig. 1, with the rubber block being removed from the link assembly;

Fig. 4 is a view partly in end elevation and partly in section of a modified form of tractor block;

Fig. 5 is a plan view, partly in section, of the tractor block shown in Fig. 4;

Fig. 6 is an end view, partly in section, of another modified form of tractor block;

Fig. 7 is similar to Fig. 6 but illustrates still another modified form of tractor block;

Fig. 8 is a view similar to Figs. 6 and 7 but illustrates yet another modified form of tractor block;

Fig. 9 is a perspective view of a part of the link assembly incorporated in the tractor block of Fig. 8;

Fig. 10 is a cross-sectional view of the partial link assembly shown in Fig. 9, and taken on line X—X of Fig. 9;

Fig. 11 is a perspective view of metal means used to make the outer bushing member shown incorporated in the tractor block of Fig. 6;

Fig. 12 is a perspective view of the metal member used to make the outer bushing member of the link assembly shown in Figs. 9 and 10, and incorporated in the tractor block of Fig. 8;

Fig. 13 is a bottom plan view of a tread design which may be incorporated with the tractor block of any of the several modifications;

Fig. 14 is a view similar to Fig. 13 but illustrates another form of tread design;

Fig. 15 is similar to Figs. 13 and 14 but illustrates still another tread design for the tractor block;

Figure 18:
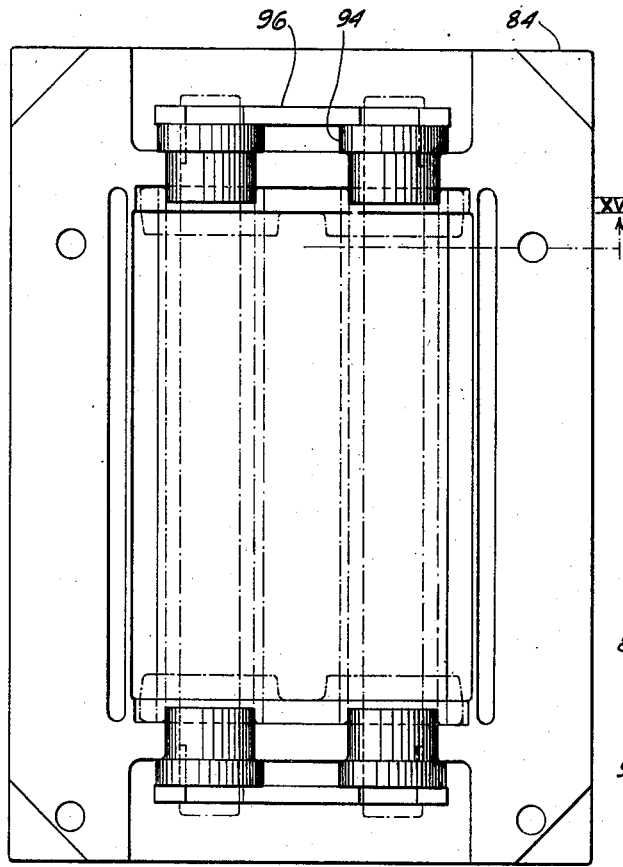
Fig. 18 is a plan view of one of the mold parts, and is taken on line XVIII—XVIII of Fig. 17.

In the drawings, the numeral 20 indicates generally an endless track formed from a plurality of individual shoes or blocks 22, each block including metal linkage, indicated as a whole by the numeral 24, covered with a body of rubber 26. Each block 22 also includes a pair of transversely positioned rubber bushings 28 having outer metal members 30 which are secured together by longitudinally extending laterally positioned links 32 forming a part of the linkage assembly. Each rubber bushing 28 includes an inner metal member, which usually takes the form of a pin 34 positioned axially of the outer metal member 30, with the ends of the pin 34 extending laterally beyond the links 32.

The plurality of blocks 22 of the endless track are connected together by known means, forming no part of the present invention but comprising, as illustrated in Fig. 1, C-shaped tie clamps 36 which engage around the ends of the pins 34 of adjacent blocks, with a wedge 38 being adapted to hold the ends of the pins 34 in position through the agency of a clamping bolt 40 secured to the wedge 38 and extending through the C-shaped clamp link 36. It should be noted that each one of the pins 34 of the bushings 28 is provided with a flat spot 42 which is engaged by the ends of the wedge 38 so that the pins 34 are held against relative rotary movement with respect to the C-shaped link 36. Secured to the C-shaped link 36 is a plate 44 having a radially inwardly extending lug 46 which serves as a guide for the endless track and which engages with the sides of a supporting wheel 48 or a driving wheel 50 of the means for supporting and driving the endless track.

An important part of my advance in the art is to modify the usual tubular outer metal member of each bushing which has caused the objectionable stress concentration set forth above in the preamble of the specification. One method of accomplishing the stress elimination is illustrated in Figs. 2 and 3 of the drawings wherein the outer metal member 30 of each bushing 28 is formed with a relatively wide slot 56 in the region adjacent the tread surface 58 of each block. The wide slots 56 extend substantially the full length of the outer metal member 30, and, as will be quite evident from an inspection of Fig. 2, the cutting of the slot not only permits a bonding of the rubber of the block 26 with the rubber of each bushing, but, also, increases the distance between the tread surface 58 of each rubber block and the outer metal means of each bushing over the distance which would be provided were the slots not present. I have found from my actual production work on this invention that it is possible to increase the cushioning thickness of the rubber by $\frac{1}{16}$ of an inch, or even more, on tractor blocks of the relatively small size now being manufactured in production quantities.

Furthermore, the cutting out of the metal to produce the slots 56 effects a saving of weight in the complete endless track of as much as 80 to 85 pounds per tank or other vehicle and this is a direct saving without sacrifice of function or strength. Also, the bonding of the rubber of the block 26 to the rubber of the bushing and the cutting away of the metal of the bushing prevents the bushing from acting as an anvil against which the rubber of the block is pounded. A pounding or other stress imparted to the tread surface 58 of the rubber block 26 is absorbed not only by the cushioning action of the rubber between the tread and the bushing but is also absorbed by the rubber of the bushing itself. Thus, I have found that the life of the type of block illustrated in Fig. 2 is greatly prolonged over the known life of former types of rubber blocks for the reason that the cushioning action is better, a greater thickness of cushioning rubber is provided without any increase in the weight or size of rubber employed, and because a hard anvil surface is not provided by the bushing itself.

The modified form of tractor shoe or block illustrated in Fig. 4 is generally similar to that already described and illustrated in Figs. 1 to 3, but the form of the invention shown in Fig. 4 includes a pair of slots 56a and 56b which are cut in the outer metal member 30a of each bushing incorporated in the block. The provision of a pair of slots 56a and 56b in each outer metal member 30a not only facilitates the vulcanization of the block, as hereinafter described, but also provides for improved cushioning action of the block, and, specifically, permits the block to be turned over and operated upside down after the original tread surface of the block has become worn. The block assembly shown in Figs. 4 and 5 is in all other respects similar to that already described and includes side links 32a connecting the outer metal members 30a together, and metal pins 34a.

The form of my invention illustrated in Fig. 6 is quite similar to that shown in Fig. 2 except that the edges of the slot or opening 56c provided in each outer metal member 30c by each bushing is formed with rolled-back or tubular edges 62 which tend to reduce and eliminate any cutting of the rubber at the end of the slot 56c. This type of outer metal member 30c for each bushing may be made in the manner illustrated in Fig. 11 of the drawings from a long strip of metal which is formed to the desired cross-sectional contour and is then cut into individual lengths. This manner of forming the outer metal member is more convenient than making the outer metal member in the form of a tube and thereafter attempting to slot the tube and roll the edges.

The modification of my invention illustrated in Fig 7 is exactly like that shown in Fig. 2 except that the rubber block is formed with a track portion of materially greater thickness than the embodiment of the invention shown in Fig. 2. The tread portion of an increased thickness has been indicated by the numeral 64 and obviously this tread may take a plurality of configurations, certain typical configurations being illustrated in Figs. 13 to 15. Fig. 13 shows a chevron design, Fig. 14 shows a parallel bar design, and Fig. 15 shows an I-shaped tread contour.

In Fig. 8 I have illustrated still another block or shoe in which the rubber bushing includes an outer metal member 30d formed of a pair of curved metal pieces having rolled or inturned ends 62d. The metal pieces 30d may be formed from a long strip, as shown in Fig. 12, which is bent to the desired cross-sectional contour and cut into appropriate lengths. The separate metal strips 30d are brazed or welded to the links 32d in a manner that will be clear from the showing of Figs. 9 and 10.

Figure 17:
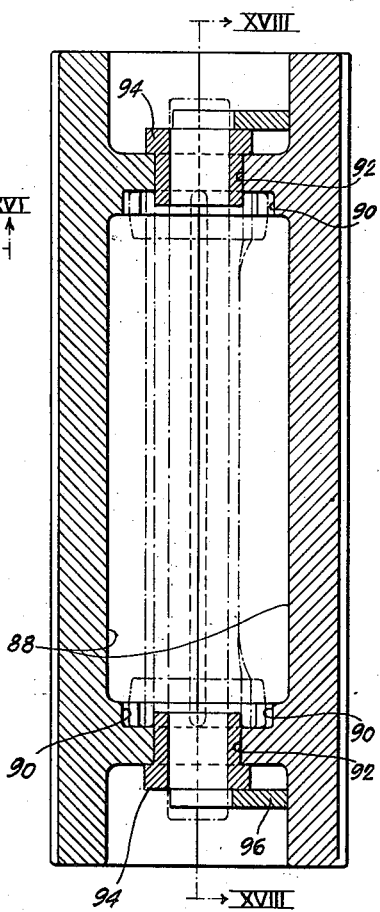
Fig. 17 is a longitudinal, cross-sectional view taken on line XVII—XVII of Fig. 16.
Figure 16:
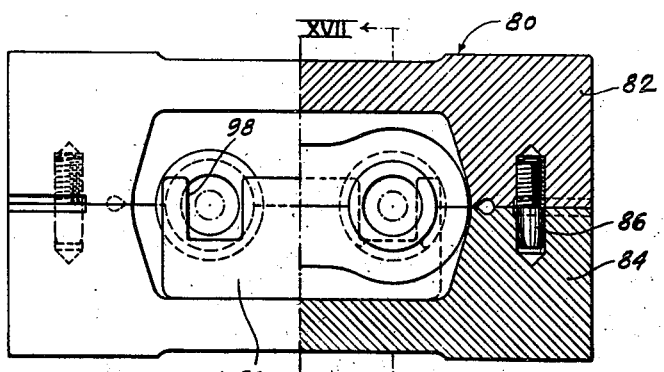
Fig. 16 is an end elevation, partly in section, of a mold adapted to vulcanize any one of the several tractor blocks illustrated.

Turning now to Figs. 16 to 18 I have illustrated one typical form of apparatus for vulcanizing any of the several modifications of the block or shoe of my invention. Specifically, the apparatus includes a multi-part mold, indicated as a whole by the numeral 80, and generally comprising an upper half 82 and a lower half 84 which are adapted to be joined together in aligned relation which may be assured by the provision of aligning pins 86. Each mold half is formed with a complementary cavity 88, and the ends of the cavity are appropriately shouldered or recessed as at 90 so as to receive the pair of links 32 of the link assembly. Inasmuch as the outer metal members 30 of each bushing form a part of the link assembly and are previously secured to the links 32, the entire link assembly can be supported as a unit. This is achieved by providing collars 94 which extend into the ends of the outer metal members 30 and with the collars 94 being received by recesses 92 at the ends of the molds so that all portions of the outer metal members 30 are spaced from the walls of the cavity 88 and the links 32 are held in the recesses 90. The collars 94 also support the pins 34 of the bushings in a position axially of the outer metal members 30 of the bushings. In addition, at least one of the mold halves carries a plate 96 which is formed with a pair of openings 98 (see Fig. 16) each opening engaging with the flat spot 42 formed on each pin 34. Thus, each pin is properly aligned angularly with the other pins in the mold and is held during vulcanization against rotary movement.

In the use of the apparatus just described, and in accordance with the practice of the method of my invention, I first provide a flat body of rubber which is positioned in the bottom mold cavity after which the link assembly is mounted in the mold and the collars 94 are positioned in the lower mold half to receive the pins 34 of the block. Thereupon a block of rubber is positioned between the outer metal members of the link assembly and a third layer of rubber is positioned on top of the link assembly after which the upper mold half is moved into position and heat and pressure are supplied to the mold to cause a flow of the several rubber layers and blocks around the outer periphery of the outer metal members of each bushing, and to simultaneously cause a flow of the rubber between the pins 34 and the inner periphery of each outer metal member of the bushings. The several metal parts of the assembly are appropriately brass-plated, cemented, tie-gum coated, or otherwise treated, to facilitate the vulcanization of the rubber thereto and the complete assembly is vulcanized. Obviously the slot, slots, clearances, or openings provided in the outer metal member of each bushing facilitate the flow of rubber into the bushing proper so that in a single operation the rubber for the bushing and the rubber for the block proper is vulcanized securely in place.

As an alternative to the method just described, I may provide only a pair of rubber blocks or pieces, each one of which is appropriately formed and grooved, cross-sectionally, as for example, by an extruding operation followed by cutting to length, so that the rubber blocks will, when positioned in the upper and lower mold halves receive and substantially surround the link assembly. The vulcanizing operation is the same as just described with the mold being placed in a suitable platen press to provide the necessary molding pressure and with vulcanizing heat being supplied to the mold through the platen press or by means of surrounding steam in a manner that will be readily understood by a person skilled in the art.

From the foregoing, it will be recognized that the various objects of my invention have been achieved by the provision of an improved block or shoe for an endless vehicle track, and by the provision of improved means and methods for manufacturing the same. The resulting block provides better cushioning action, has greatly prolonged life, avoids the concentration of stress between the rubber bushings and the tread surface of the block, is of reduced weight, is less expensive to manufacture, and functions to resist radial movement of the bushing pins so that the stretch of an endless track made from the individual blocks is reduced, often as much as several inches, whereby throwing of the track from the supporting and driving means during use is largely eliminated. My improved apparatus is relatively inexpensive and is readily operated by the ordinary workman to rapidly and uniformly produce my improved tractor block. The method of my invention is rapid, inexpensive, readily performed, and produces under production conditions the high grade improved block or shoe of my invention.

While, in accordance with the patent statutes I have specifically illustrated and described my invention, it should be understood that I am not to be limited thereto or thereby, but that the scope of my invention is defined in the appended claims.

What I claim is:

1. A tread shoe for an endless track, said shoe being of the type including a pair of longitudinally extending metal links secured together at their ends by transversely extending bushing members including outer metal means and inner metal means joined together by rubber, said metal links and bushing members being surrounded by and embedded in a block of rubber, said shoe being characterized by said outer metal means in the bushing members being shaped to provide a greater rubber thickness between the tread surface of the shoe and the metal means than if the outer metal means were cylindrical and without any increase in the distance between the tread surface and the axis of the bushing, and having wide clearance spaces equal in width to at least about half of the diameter of the bushing through which the rubber of the bushing joins the rubber of the block and in the regions adjacent the tread surface of the block.

2. A tread shoe for an endless track, said shoe being of the type including a pair of longitudinally extending metal links secured together at their ends by transversely extending bushing members including outer metal means and inner metal means joined together by rubber, said metal links and bushing members being surrounded by and embedded in a block of rubber, said shoe being characterized by said outer metal means in the bushing members having wide clearance spaces equal in width to at least about half of the diameter of the bushing through which the rubber of the bushing joins the rubber of the block and in the regions adjacent the tread surface of the block.

3. A tread shoe for an endless track, said shoe being of the type including a pair of longitudinally extending metal links secured together at their ends by transversely extending bushing members including outer metal means and inner metal means joined together by rubber, said metal links and bushing members being surrounded by and embedded in a block of rubber, said shoe being characterized by said outer metal means in the bushing members shaped with clearance spaces to provide a greater rubber thickness between the tread surface of the shoe and the metal means than if the metal means were fully circular and without any increase in the distance between the tread surface and the axis of the bushing.

4. A tread shoe for an endless track, said shoe including a pair of rubber and metal bushings, longitudinally extending, laterally positioned metal links secured together at their ends by the transversely extending bushings, each bushing including outer metal means and inner metal means joined together by rubber, said metal links and bushing members being surrounded by and embedded in a block of rubber, the outer metal means in the bushings being formed with wide clearance spaces equal in width to at least about half of the diameter of the bushing through which the rubber of the bushing joins the rubber of the block and in the regions adjacent the tread surface of the block.

5. A tread shoe for an endless track, said shoe including a pair of rubber and metal bushings, longitudinally extending, laterally positioned metal links secured together at their ends by the transversely extending bushings, each bushing including outer metal means and inner metal means joined together by rubber, said metal links and bushing members being surrounded by and embedded in a block of rubber, the outer metal means in the bushings being formed with diametrically opposed wide clearance spaces equal in width to at least about half of the diameter of the bushing through which the rubber of the bushing joins the rubber of the block and in the regions adjacent the tread surface of the block, said block of rubber being of substantially equal thickness to the top and bottom side of the bushing axes.

6. A tread shoe for an endless track, said shoe including a pair of rubber and metal bushings longitudinally extending, laterally positioned metal links secured together at their ends by the transversely extending bushings, each bushing including outer metal means and inner metal means joined together by rubber, said metal links and bushing members being surrounded by and embedded in a block of rubber, the outer metal means in the bushings being formed with wide clearance spaces through which the rubber of the bushing joins the rubber of the block and in the regions adjacent the tread surface of the block, said outer metal means having rolled-back edges adjacent the clearance spaces.

7. A tractor block including a body of rubber, a pair of rubber and metal bushings embedded in spaced parallel relation in the body of rubber, each bushing including a metal tube, a pin extending axially through the metal tube, a sleeve of rubber positioned between the tube and the pin, each tube having a wide slot formed therein toward the tread side of the rubber body and substantially equal in length to the length of the tube, said rubber sleeve and body being vulcanized to the pins and tubes, and metal links connecting adjacent ends of the metal tubes.

8. A tractor block including a body of rubber, a pair of rubber and metal bushings embedded in spaced parallel relation in the body of rubber, each bushing including a metal tube, a pin extending axially through the metal tube, a sleeve of rubber positioned between the tube and the pin, each tube having a long wide slot formed therein toward the tread side of the rubber body, said rubber sleeve and body being vulcanized to the pins and tubes, and metal links connecting adjacent ends of the metal tubes, said tube adjacent the slot being formed with rolled-back edges to eliminate rubber cutting.

9. A tractor block including a body of rubber, a pair of rubber and metal bushings embedded in spaced parallel relation in the body of rubber, each bushing including a metal tube, a pin extending axially through the metal tube, a sleeve of rubber positioned between the tube and the pin, each tube having a pair of opposed long wide slots formed therein toward the upper and lower tread sides of the rubber body, said slots having a length substantially equal to the length of the tubes and a width equal to at least about one half of the diameter of the tube, said rubber sleeve and body being vulcanized to the pins and tubes and to each other, and longitudinally extending, laterally positioned metal links connecting adjacent ends of the metal tubes.

10. A tractor block including a body of rubber, a pair of rubber and metal bushings embedded in spaced parallel relation in the body of rubber, each bushing including a metal tube, a pin extending axially through the metal tube, a sleeve of rubber positioned between the tube and the pin, each tube having a pair of opposed long wide slots formed therein toward the upper and lower tread sides of the rubber body, said rubber sleeve and body being vulcanized to the pins and tubes and to each other, and longitudinally extending, laterally positioned metal links connecting adjacent end of the metal tubes, said tube adjacent the slots being formed with rolled-back edges to eliminate rubber cutting.

11. A tractor block including a body of rubber, a pair of rubber and metal bushings embedded in spaced parallel relation in the body of rubber, each bushing including a metal tube, a pin extending axially through the metal tube, a sleeve of rubber positioned between the tube and the pin, each tube having a plurality of slots formed therein, said slots having a length substantially equal to the length of the tubes and a width equal to at least about one half of the diameter of the tube, said rubber sleeve and body being vulcanized to the pins and tubes and to each other through the slots, and metal links connecting adjacent ends of the metal tubes.

12. A tractor block including a body of rubber, a pair of laterally positioned rubber and metal bushings embedded in spaced parallel relation in the body of rubber, each bushing including a metal tube, a pin extending axially through the metal tube, a sleeve of rubber positioned between the tube and the pin, each tube having a long wide slot formed therein toward the tread side of the rubber body, said slots having a length substantially equal to the length of the tubes and a width equal to at least about one half of the diameter of the tube, said rubber sleeve and body being vulcanized to each other through the slot, and metal links connecting adjacent ends of the metal tubes.

13. A tractor block including a body of rubber, a pair of rubber and metal bushings embedded in spaced parallel relation in the body of rubber, each bushing including an outer metal member, a pin extending axially through the metal member, a sleeve of rubber positioned between the member and the pin, each member having a long wide clearance space therein toward the tread side of the rubber body, said clearance space having a width equal to at least about one half of the diameter of the member and a length substantially equal to the length of the member.

14. Apparatus for molding tractor blocks, and the like, and comprising a two part mold, said mold being formed with complementary recesses for receiving and supporting within the mold side links and outer bushing members of metal, removable collars received within suitable apertures in the mold and adapted to support metal pins axially within and spaced from the outer bushing members, the ends of the metal pins being adapted to extend to the outside of the mold, and means carried by at least one part of the mold and adapted to engage with the metal pins and rotatively position them.

15. That method of molding a tractor block for an endless track which includes the steps of positioning a pair of side links joined together with transverse outer bushing members so as to leave the outer surfaces of the bushing members exposed, supporting a pair of pins axially of the outer bushing members, holding the supporting pins in the desired angular relation to each other, positioning a body of rubber against the bottom of the side links and outer bushing members, positioning a second body of rubber between the two outer bushing members, positioning a third body of rubber against the top of the side links and outer bushing members, and applying heat and pressure to the three bodies of rubber to cause the rubber to flow around each pin and within each outer bushing member and to flow around the exposed outer surface of each outer bushing member and to be vulcanized securely thereto.

16. That method of molding a tractor block for an endless track which includes the steps of positioning a pair of side links joined together with transverse outer bushing members so as to leave the outer surfaces of the bushing members exposed, supporting a pair of pins axially of the outer bushing members, holding the supporting pins in the desired angular relation to each other, positioning a body of rubber against the bottom of the side links and outer bushing members, positioning a second body of rubber against the top of the side links and outer bushing members, and applying heat and pressure to the two bodies of rubber to cause the rubber to flow around each pin and within each outer bushing member and around the exposed outer surface of each outer bushing member.

GORDON I. McNEIL.